United States Patent [19]
Levasseur et al.

[11] 3,851,256
[45] Nov. 26, 1974

[54] DEPHASING CIRCUIT

[75] Inventors: Georges Levasseur, Goussainville; Michel Garconnat, Ris Organis, both of France

[73] Assignee: Compagnie Industrial Des Telecommunications CIT-ALCATEL, Paris, France

[22] Filed: Dec. 20, 1973

[21] Appl. No.: 426,542

[30] Foreign Application Priority Data
Dec. 20, 1972 France .......... 72.45391

[52] U.S. Cl. .......... 328/55, 328/155
[51] Int. Cl. .......... H03b 3/04
[58] Field of Search .......... 328/55, 56, 155, 166

[56] References Cited
UNITED STATES PATENTS

| | | | |
|---|---|---|---|
| 3,201,706 | 8/1965 | Piety | 328/55 X |
| 3,612,916 | 10/1971 | O'Neill | 328/155 X |
| 3,622,809 | 11/1971 | Williams | 328/55 X |
| 3,792,362 | 2/1974 | Grant | 328/55 X |

*Primary Examiner*—John S. Heyman
*Attorney, Agent, or Firm*—Craig & Antonelli

[57] ABSTRACT

Device for dephasing by 90° comprising a chain of three identical elementary dephasers connected up in series, each dephasing by an angle varying with the frequency, that angle being equal to 90° for $F = F_o$, an attenuator connected up in series to the output of the chain and an adder carrying out the sum of the output signals of the attenuator and of the first dephaser of the chain.

6 Claims, 7 Drawing Figures

DEPHASING CIRCUIT

The present invention relates to a dephasing device enabling a signal dephased substantially by 90° in relation to the input signal to be obtained at its output.

Among known dephasing devices, there exist a first type enabling a signal having constant amplitude and whose dephasing varies according to the frequency of the sign input signal to be obtained at its output and a second type of dephaser enabling a signal having constant dephasing but whose amplitude varies according to the frequency of the input signal to be obtained at its output.

Dephasers of the second type are used for obtaining a signal dephased by 90° in relation to the input signal as, for example, in the signal receiving devices having two wave collectors with an improved signal-to-noise ratio such as described in French Pat. No. 7,017,868, or a frequency summing device such as described in French Pat. application No. 72 45 392, filed by the applicant.

Now dephasers of the second type have the disadvantage of providing a dephased signal whose amplitude varies with the frequency of the input signal. Moreover, that amplitude tends towards zero when the frequency tends towards infinity, this being a cause of instability and noise.

The 90° dephasing device according to the invention aiming at overcoming these disadvantages enables an output signal whose amplitude remains substantially constant in a wide frequency band about the central frequency and whose dephasing in relation to the input signal remains approximately 90° in that same frequency band to be obtained. Moreover, the amplitude of the output signal outside the useful band may vary only between a lower limit equal to 1 and an upper limit equal at the most to approximately 2, in relation to the amplitude of the output signal at the frequency $F_o$.

For that purpose, the dephasing device according to the invention comprises a first elementary dephaser provided with an input and an output receiving on the said input the electric input signal whose frequency F varies in a frequency band centered on Fo and supplying on the said output a signal whose amplitude is equal to the amplitude of the input signal and whose dephasing in relation to the electric signal applied to the input depends on the frequency F of that signal, the dephasing being equal to 90° for the frequency $F_o$, a chain composed of 2n elementary dephasers (n being a positive integer), being identical to the said first elementary dephaser and comprising an input and an output, the input of that chain being connected up to the output of the said first elementary dephaser, an attenuator provided with an input and an output, the input of the attenuator being connected up to the output of the said chain, a summing element comprising a first and second input and an output supplying an output signal dephased by 90° in relation to the input signal, the said first input of the summing element being connected to the output of the said first elementary dephaser and the said second input of the summing element being connected up to the output of the attenuator.

The following description with reference to the accompanying figures will make it easier to understand how the invention may be implemented.

FIG. 1 shows the diagram of a known elementary dephaser. That dephaser makes it possible to obtain a signal having constant amplitude whose dephasing varies with the frequency of the input signal.

The dephaser comprises an operational amplifier Q having a gain in an open loop which is very high and comprising a first and a second input and an output.

The input signal is applied to the first input through a resistor $R_1$ and to a second input through a capacitor $C_1$. That second input is earthed through a resistor $R_2$. A resistor $R_3$ is connected up between the first input and the output.

Assuming that $R_1 = R_3 = 2\ R_2$, the transfer function of that elementary dephaser is $$H(j\omega) = (R_2C_1j\omega - 1)/(R_2C_1j\omega + 1)$$

$\omega$ being the pulsation of the input signal where $\omega = 2\pi F$. F being the frequency of the input signal and j being the square root of $-1$.

The output signal has an amplitude equal to that of the input signal and it is dephased by an angle of $\theta$ where $\theta = 2$ arc tg $1/R_2C_1\omega$ That dephasing is equal to 90° when the frequency assumes a value $F_o$ satisfying the expression $$2\ \pi\ R_2\ C_1\ F_o = 1$$

Figure 2:
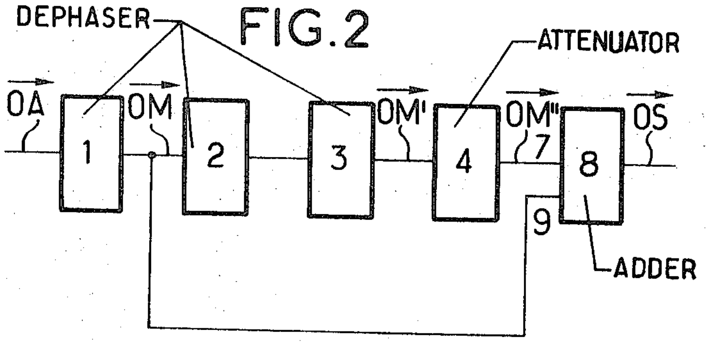
FIG. 2 shows the block diagram of the preferred embodiment of the dephasing device according to the invention.

FIG. 2 shows the block diagram of the preferred embodiment of the dephasing device according to the invention.

Figure 1:
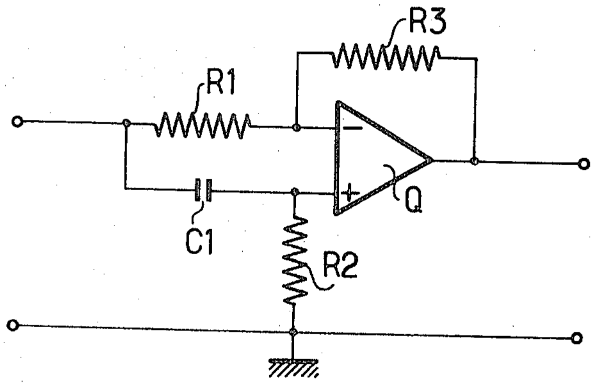
FIG. 1 shows the diagram of a known elementary dephaser.

The device comprises three identical elementary dephasers 1, 2, 3 of the type shown in FIG. 1, dephasing by 90° for the frequency $F_o$. The dephasers 1, 2, 3 are connected up in series and the output of the dephaser 3 is connected up to the input of an attenuator 6 whose output is connected up to the first input 7 of an adder 8 whose second input 9 is connected up to the output of the first dephaser 1.

Figure 3:
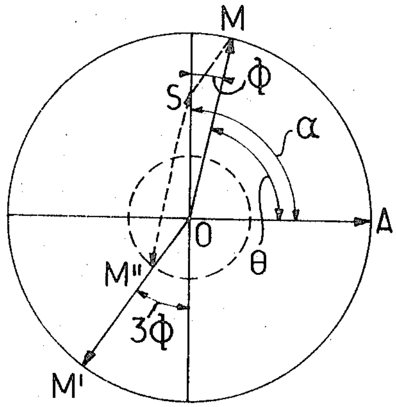
FIG. 3 shows, in a vectorial form, the electric signals at different points of the dephasing device according to the invention.

The operation of that device will be better understood on referring to FIG. 3 showing an explanatory diagram in which the electric signals have been shown by their Fresnel vector.

It is assumed that $\overrightarrow{0A}$ is the horizontal vector representing the input signal having a frequency F.

At the output of the dephaser 1, a vector $\overrightarrow{0M}$ having the same module as $\overrightarrow{0A}$ but dephased by the angle $\theta = \pi/2 - \phi$.

When the frequency F is equal to $F_o$, $\phi = \pi/2$.

At the output of the dephaser 3, a signal which may be represented by a vector $\overrightarrow{0M}'$ dephased by $3\theta$ that is $3\pi/2 - 3\phi$ in relation to $\overrightarrow{0A}$ but having the same module is obtained.

The signal represented by $\vec{0M}'$ is applied to the attenuator 6, which attenuates it by a factor k in such a way that a further signal represented by the vector $\vec{0M}'' = \vec{0M}'/k$ is obtained.

In the adder 8, the sum of the two vectors $\vec{0M}$ and $\vec{0M}''$ is worked out and a signal represented by the vector $\vec{0S}$ dephased by the angle $\alpha$ in relation to $\vec{0A}$ is obtained. Assuming that $\vec{0A} = 1$, the result obtained is $$OS^2 = 1 + 1/k2 - 2/k \cos 2\phi \text{ and } \operatorname{tg} \pi/2 - \alpha = (\sin\phi - 1/k \sin 3\phi)/(\cos\phi \pm 1/k \cos 3\phi)$$

The sign $\pm$ depends on the quadrant in which $\vec{0M}'$ is situated. In the first quadrant, the sign is minus; $k$ is selected either equal to 3, or almost equal to 3.

Figure 4:
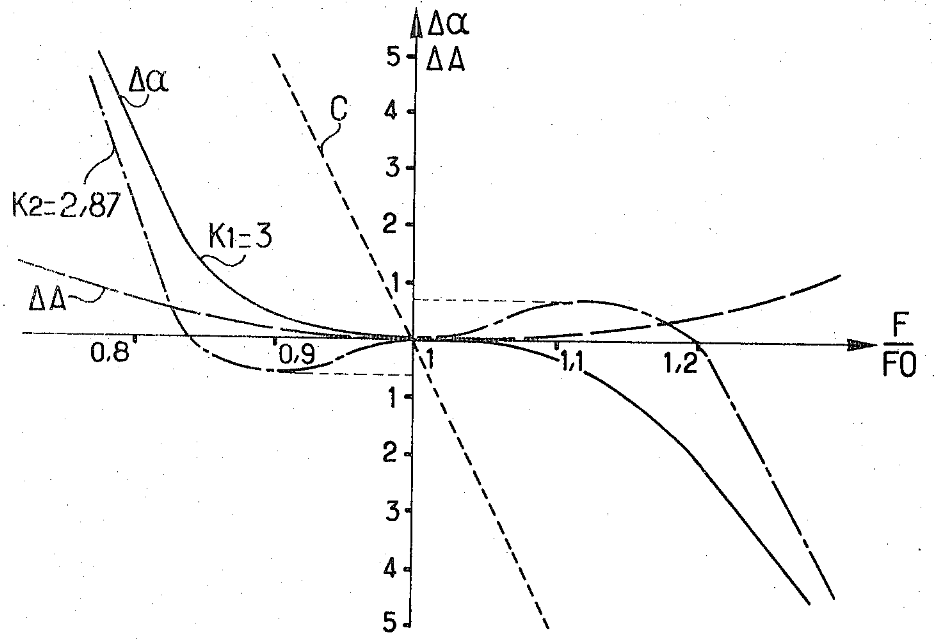
FIG. 4 shows the curves of the variation in the dephasing and in the amplitude as a function of the input frequency.

On the graph in FIG. 4, the relative frequency $F/F_o$ of the input is shown in the abscissa and the variation $\Delta\alpha$ of the angle $\alpha$ of dephasing $\alpha$ in degrees and the variation $\Delta A$ in the amplitude of the final signal 0S in decibels are shown in the ordinates.

The curves have been shown for two values of $k$, $k_1 = 3$ and $k_2 = 2.87$, $k_2$ being selected so that the curve $\Delta\alpha$ cuts the axis of the frequencies at the point: $F/F_0 = 1.2$.

The amplitude curve varies little for the two values of $k$ selected.

It will be observed that it is possible to obtain, taking $k = 3$, a dephasing of 90° ± 0.2° and a variation in amplitude less than 0.2 dB in a relative frequency band of 20 percent centered on $F_o$.

It will be observed, moreover, that where $k = 3$, 0S varies between 2/3 and 4/5 when F tends toward infinity, that is $1 \leq OS(F)/oS(F_o) \leq 2$.

If it is required to operate in a relative band in the order of 40 percent, it is more interesting to take $k = 2.87$ and a dephasing of 90° ± 0.05° and a variation in amplitude less than 1.2 dB are thus obtained.

To bring out the advantages of the dephasing device according to the invention, on an elementary dephaser, curve C representing the variations in phase obtained by means of the elementary dephaser shown in FIG. 1 as a function of the relative frequency $F/F_o$ is shown in FIG. 4.

It will be observed that for a relative variation in frequency of ± 10 percent about unity, the variations phase variations are ± 5° about 90°.

Figure 5:
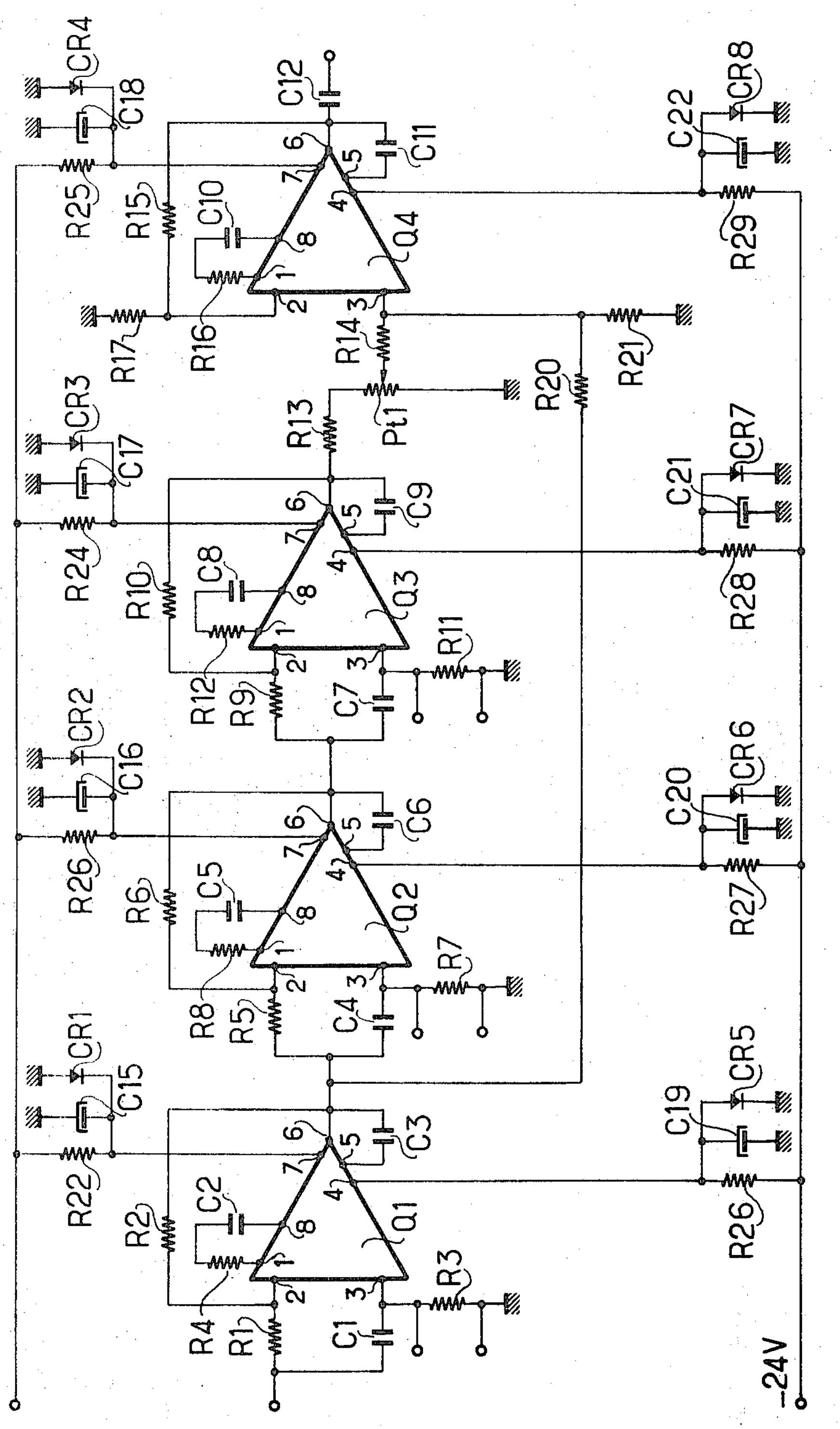
FIG. 5 shows the detailed diagram of the device shown in a block diagram in FIG. 2.

FIG. 5 shows the more detailed diagram of the dephasing device according to the invention shown in a block diagram in FIG. 2.

The values of the elements have been calculated so that the central frequency be 4,900 c/s and are indicated in the following table where $Q_1$, $Q_2$ and $Q_3$ are the operational amplifiers of the dephasers 1, 2 and 3, $Pt_1$ is a variable potentiometer used as an attenuator 6 and $Q_4$ is an operational amplifier connected up as an adder.

| Designation of the Elements | Quantity | Description |
|---|---|---|
| $R_{22}$ à$R_{29}$ | 8 | −3,3 k Ω ± 5% |
| $R_{17}$ − $R_{21}$ | 2 | 1 k Ω ± 1% |
| $R_{16}$ | 1 | 1,5 k Ω ± 5% |
| $R_{15}$ | 1 | 150 k Ω ± 1% |
| $R_{14}$ − $R_{20}$ | 2 | 100 k Ω ± 1% |
| $R_{13}$ | 1 | 5 k Ω ± 5% |
| $R_4$ − $R_8$ − $R_{17}$ | 3 | 1,50 k Ω ± 5% |
| $R_2$ − $R_6$ − $R_{10}$ | 3 | 4,75 k Ω ± 1% |
| $R_3$ − $R_7$ − $R_{11}$ | 3 | 9,31 k Ω ± 1% |
| $R_1$ − $R_5$ − $R_9$ | 3 | 9,31 k Ω ± 1% |
| $Pt_1$ | 1 | 5 k Ω |

-Continued

| Designation of the Elements | Quantity | Description |
|---|---|---|
| $Q_1$ to $Q_4$ | 4 | Integrated/circuit μA 709 M |
| $CR_1$ to $CR_8$ | 8 | Diode 1 N 4446 |
| $C_{15}$ to à$C_{22}$ | 8 | 4, 7 μF ± 20% |
| $C_{12}$ | 1 | 2, 2 pF ± 20% |
| $C_{11}$ | 1 | 5, 6 pF ± 10% |
| $C_{10}$ | 1 | 100 pF ± 10% |
| $C_3C_6C_9$ | 3 | 68 pF ± 10% |
| $C_2C_5C_8$ | 3 | 1000 pF ± 10% |
| $C_1C_4C_7$ | 3 | 6800 pF ± 1% |

Figure 6:
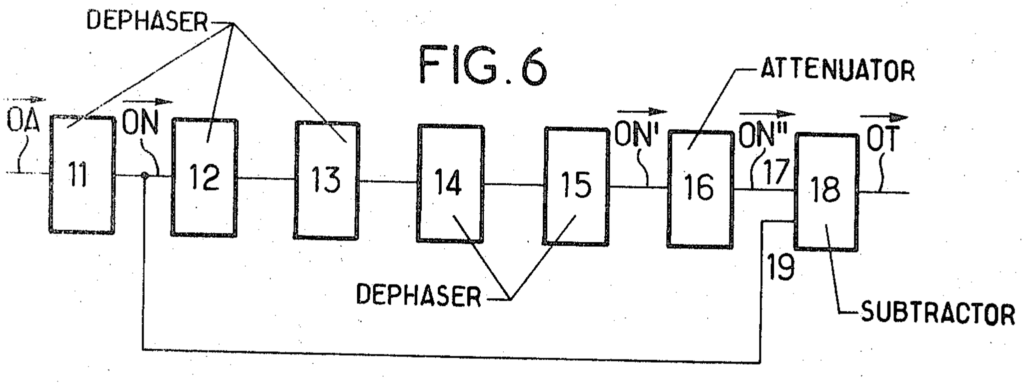
FIG. 6 shows a variant of the dephasing device according to the invention.

FIG. 6 shows a second variant of the invention comprising five identical elementary dephasers of the same type as that in FIG. 1 and dephasing by 90° for a frequency of $F_o$.

These five dephasers 11, 12, 13, 14, 15 are connected up in series and the output of the last dephaser 15 is connected up to the input of an attenuator 16 attenuating the signal applied with the factor k.

The output of the attenuator 16 is applied to the first input 17 of a subtractor 18 comprising a second input 19 to which is connected the output of the first dephaser 11.

Figure 7:
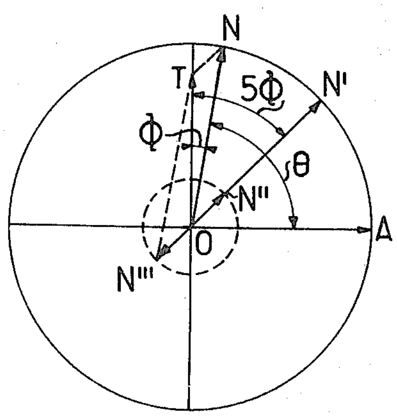
FIG. 7 shows, in a vectorial form, the electric signals taken at different points of the dephasing device shown in FIG. 6.

A signal whose frequency is F, represented by the Fresnel vector $\vec{0A}$ (see FIG. 7) is applied to the input of the dephaser 11. The signal obtained at the output of the first dephaser 11 is represented by the vector 0N dephased by an angle $\pi/2 - \phi$ in relation to $\vec{0A}$ but having the same amplitude.

At the output of the dephaser 15, a signal $\vec{0N}'$ dephased by $5(\pi/2 - \phi)$, which is $\pi/2 - 5\phi$, to the nearest $2\pi$ in relation to $\vec{0A}$.

A signal represented by the vector $\vec{ON}'' = \vec{ON}'/k = -\vec{ON}''$ is obtained at the output of the attenuator 16 and the signal obtained at the output of the subtractor 18 may be represented by the vector $\vec{OT} = \vec{ON} + \vec{ON}''$.

It is assumed that $k = 5$ and when F varies on either side of $F_o$ in a sufficiently narrow frequency band, it is observed that the vector $\vec{0T}$ is dephased by an angle close to 90° and that its amplitude remains substantially constant. Moreover, the value $\vec{0T}$ at the frequency F in relation to the value of 0T at the frequency $F_o$ remains comprised between 1 and 3/2.

The dephasing device according to the invention may be generalized by using $(2n + 1)$ elementary dephasers, n being a positive integer, arranged in series and followed by an attenuator having an attenuation factor equal to or close to $(2n + 1)$ and by a summing element. That summing element is either an adder if n is an odd number or a subtractor if n is an even number. It should be observed that when n increases, the relative frequency band inside which the variation of the dephasing of the signal remains less than a given angle (1° for example) decreases.

Consequently, the preferable solution consists in selecting n at the lowest value possible, that is, equal to unity.

Although the dephasing devices which have just been described appear to afford the greatest advantage for implementing the invention, it will be understood that various modifications may be made thereto without going beyond the scope of the invention, it being possible to replace certain of its elements by other elements capable of fulfilling the same technical function or an equivalent function therein.

What is claimed is:

1. A device for dephasing an input signal by 90° comprising a chain of $2n + 1$ elementary dephaser means ($n$ being a positive integer), each elementary dephaser means providing at its output a signal whose amplitude is equal to the amplitude of a signal applied to its input and whose dephasing in relation to said signal applied to its input depends on the frequency of that signal, means for supplying to the input of the first elementary dephaser means of said chain an input signal whose frequency F varies in a frequency band having a central frequency $F_o$, an attenuator connected to the output of said chain, and a summing circuit having a first input connected to the cutput of the first dephasing means of said chain and a second input connected to the output of said attenuator.

2. A device as defined in claim 1 wherein said attenuator has an attenuation factor of $1/(2n + 1)$.

3. A device as defined in claim 1 wherein n is an odd number and said summing circuit is an adder.

4. A device as defined in claim 3 wherein n is equal to unity.

5. A device as defined in claim 1 wherein n is an even number and said summing circuit is a subtractor.

6. A device as defined in claim 1 wherein $n$ is equal to 2.

* * * * *